(12) United States Patent
Xu et al.

(10) Patent No.: US 7,255,965 B2
(45) Date of Patent: *Aug. 14, 2007

(54) NON-AQUEOUS ELECTROLYTIC SOLUTION

(75) Inventors: Wu Xu, Broadview Heights, OH (US); Zhongyi Deng, Valley View, OH (US); Pascal Bolomey, Solon, OH (US)

(73) Assignee: Ferro Corporation, Cleveland, OH (US)

( * ) Notice: Subject to any disclaimer, the term of this patent is extended or adjusted under 35 U.S.C. 154(b) by 26 days.

This patent is subject to a terminal disclaimer.

(21) Appl. No.: 11/113,823

(22) Filed: Apr. 25, 2005

(65) Prior Publication Data

US 2006/0240327 A1    Oct. 26, 2006

(51) Int. Cl.
    *H01M 6/16* (2006.01)
(52) U.S. Cl. .................... 429/337; 429/338; 429/341; 429/342; 429/343; 429/331; 429/231.1; 429/231.3; 429/217
(58) Field of Classification Search ................ 429/337, 429/338, 341, 342, 343, 331, 231.1, 231.3, 429/217
    See application file for complete search history.

(56) References Cited

U.S. PATENT DOCUMENTS

| | | |
|---|---|---|
| 5,484,670 A | 1/1996 | Angell |
| 5,521,027 A | 5/1996 | Okuno |
| 5,525,443 A | 6/1996 | Okuno |
| 5,554,462 A | 9/1996 | Flandrois |
| 5,626,981 A | 5/1997 | Simon |
| 5,707,759 A | 1/1998 | Simon |
| 5,776,627 A | 7/1998 | Mao |
| 5,786,110 A | 7/1998 | Angell |
| 5,824,433 A | 10/1998 | Angell |
| 5,849,432 A | 12/1998 | Angell |
| 5,855,809 A | 1/1999 | Angell |
| 5,932,632 A | 8/1999 | Biensan |
| 5,962,169 A | 10/1999 | Angell |
| 6,001,325 A | 12/1999 | Salmon |
| 6,033,797 A | 3/2000 | Mao |
| 6,033,808 A | 3/2000 | Salmon |
| 6,071,645 A | 6/2000 | Biensan |
| 6,103,798 A | 8/2000 | Prabhu |
| 6,245,465 B1 | 6/2001 | Angell |
| 6,506,516 B1 | 1/2003 | Wietelmann |
| 6,638,662 B2 * | 10/2003 | Kaneda et al. ........... 429/231.8 |
| 2004/0076887 A1 | 4/2004 | Panitz et al. |
| 2004/0151951 A1 | 8/2004 | Hyung |
| 2004/0253512 A1 | 12/2004 | Watanabe |
| 2005/0202320 A1 * | 9/2005 | Totir et al. ............. 429/231.95 |

FOREIGN PATENT DOCUMENTS

| | | |
|---|---|---|
| JP | 1998050344 A | 2/1998 |
| JP | 2000315504 A | 11/2000 |
| JP | 2002208432 A | 7/2002 |
| WO | WO 01/99209 A2 | 12/2001 |

OTHER PUBLICATIONS

Kang Xu, Shengshui Zhang, T. Richard Jow, Wu Xu, and C. Austen Angell; "LiBOB as Salt for Lithium-Ion Batteries A Possible Solution for High Temperature Operation"; Electrochemical and Solid-State Letters, 5(1) A26-A29 (2002); The Electrochemical Society, Inc.
Wu Xu and C. Austen Angell; "LiBOB and Its Derivatives Weakly Coordinating Anions, and the Exceptional Conductivity of Their Nonaqueous Solutions"; Electrochemical and Solid-State Letters, 4 (1) E1-E4 (2001); The Electrochemical Society, Inc.
Kang Xu, Shengshui Zhang, Bruce A Poese, and T. Richard Jow; "Lithium Bis(oxalato)borate Stablizes Graphite Anode in Propylene Carbonate"; Electrochemical and Solid-State Letters, 5 (11) A259-A262 (2002); The Electrochemical Society, Inc.
Commonly Owned U.S. Appl. No. 11/113,966, filed Apr. 25, 2005.
Commonly Owned U.S. Appl. No. 11/138,769, filed May 26, 2005.
Commonly Owned U.S. Appl. No. 11/138,905, filed May 26, 2005.
Commonly Owned U.S. Appl. No. 11/138,907, filed May 26, 2005.
Commonly Owned U.S. Appl. No. 11/196,782, filed Aug. 3, 2005.
International Search Report for PCT/US06/13113 mailed Aug. 25, 2006, four pages.

* cited by examiner

*Primary Examiner*—Laura Weiner
(74) *Attorney, Agent, or Firm*—Rankin, Hill, Porter & Clark LLP

(57) ABSTRACT

The use of lithium bis(oxalate)borate (LiBOB) as an additive in a lithium secondary battery provides improved battery performance such as long life and high capacity retention after high temperature storage.

20 Claims, No Drawings

NON-AQUEOUS ELECTROLYTIC SOLUTION

BACKGROUND OF THE INVENTION

1. Field of Invention

The present invention relates to a field of nonaqueous electrolytic solutions and a secondary battery using the same. More particularly, this invention pertains to nonaqueous electrolytic solutions that comprise (a) one or more solvents; (b) one or more ionic salts; and (c) one or more additives. The present invention pertains to secondary batteries comprising such nonaqueous electrolytic solutions, and particularly to methods of making nonaqueous electrolytic solutions with a salt additive for use in lithium and lithium ion rechargeable batteries.

2. Description of Related Art

State-of-the-art lithium ion rechargeable (i.e., secondary) batteries commonly use graphite for the anode. In such battery systems, ethylene carbonate (EC) must be used as one of the co-solvents in order to form a stable solid electrolyte interface (SEI) which is beneficial to the cell performance.

However, EC has a high melting point, (ca. 36-39° C.), which limits the performance of lithium and lithium ion batteries in low temperature applications. The addition of a large amount of low viscosity, low melt point co-solvents such as linear carbonates and carboxylate esters can improve cell performance at low temperatures. Unfortunately, such co-solvents have low boiling points and are very flammable, which present problems in high-temperature applications and safety issues.

To that end, propylene carbonate (PC) has been used to fully or partially replace EC to minimize the need for other co-solvents in the electrolytic solutions because PC remains liquid over a wide temperature window (−55° C. to 240° C.). However $LiPF_6$—PC based electrolytic solutions are not compatible with graphite anode in lithium ion rechargeable batteries due to the exfoliation of graphite structure by PC intercalation.

In many cases, certain vinyl compounds such as vinylene carbonate (VC) and vinyl ethylene carbonate (VEC) have been used as additives in electrolytic solutions to help produce the SEI layer. Unfortunately, such vinyl additives can only be used up to about 3% because they decompose at the cathode when present in excess. Further, at relatively high temperatures (e.g., above 50° C.), more components in electrolytic solutions will decompose at the surface of anode material during charging and deposit at the anode. The thickness of the SEI layer increases with time, thus increasing the resistance of the SEI layer and the resistance of charge-transfer process which leads to the increase of total internal resistance of the battery and the battery performance deteriorates. Hence, there is room for improvement in the selection of an electrolyte for use in secondary batteries.

SUMMARY OF THE INVENTION

In recent years, lithium bis(oxalate)borate (LiBOB), has been studied extensively. It has been found that LiBOB—PC based electrolytic solutions in graphite lithium ion battery systems showed very good cell performance because LiBOB generates a good SEI on graphite anodes, which improves battery performance. The inventors herein have discovered that the use of LiBOB as an additive in electrolytic solutions (e.g., $LiPF_6$—EC—PC based solutions; $LiBF_4$ based solutions, etc.), improves battery performance by several key measures. Further, low temperature performance is improved because the eutectic temperature of the EC—PC based system is decreased by the addition of PC which has a high polarity, similar to that of EC.

The present invention provides a stable nonaqueous electrolytic solution for use in lithium and lithium ion secondary batteries, and a rechargeable battery using the same. In particular, the present invention provides a secondary battery comprising an anode, a cathode, and an electrolytic solution. The electrolytic solution comprises a non-aqueous solvent, a solute, and a salt additive. The salt additive is present in the electrolytic solution at a concentration of 0.001M to 0.15 M, and may be selected from the group consisting of chelated orthoborate salts and chelated orthophosphate salts. The invention further provides a secondary battery comprising an electrolytic solution, wherein the electrolytic solution comprises a non-aqueous solvent, a solute, and a salt additive, the salt additive comprising lithium bis(oxalato)borate provided that the concentration of lithium bis(oxalato)borate in the solution does not exceed 0.15 M. The invention further provides a non-aqueous electrolytic solution for use in a secondary battery comprising a first salt and lithium bis(oxalato)borate, provided that lithium bis(oxalato)borate is present in the electrolytic solution at a concentration not exceeding about 0.1 M.

Suitable lithium electrolyte salts include $LiPF_6$, $LiBF_4$, $LiClO_4$, $LiAsF_6$, $LiTaF_6$, $LiAlCl_4$, $Li_2B_{10}Cl_{10}$, $LiCF_3SO_3$, $LiE(C_nF_{2n+1}SO_2)_m$, wherein m=2 or 3, wherein E=N when m=2, and wherein E=C when m=3, and n=1-10; $LiPF_x(R_F)_{6-x}$, and $LiBF_y(R_F)_{4-y}$, wherein $R_F$ represents perfluorinated $C_1$-$C_{20}$ alkyl groups or perfluorinated aromatic groups, x=0-5, and y=0-3, and combinations thereof. Typical solvents include, without limitation, ethylene carbonate (EC), propylene carbonate (PC), dimethyl carbonate (DMC), diethyl carbonate (DEC), ethylmethyl carbonate (EMC), γ-butyrolactone (GBL), methyl butyrate (MB), propyl acetate (PA), trimethyl phosphate (TMP), triphenyl phosphate (TPP), and combinations thereof.

DETAILED DESCRIPTION OF THE INVENTION

The following embodiments describe the preferred mode presently contemplated for carrying out the invention and are not intended to describe all possible modifications and variations consistent with the spirit and purpose of the invention. These and other features and advantages of the present invention will become more readily apparent to those skilled in the art upon consideration of the following detailed description that described both the preferred and alternative embodiments of the present invention.

The invention provides a secondary battery comprising an anode, a cathode, an electrolytic solution, wherein the electrolytic solution comprises a non-aqueous solvent, a solute, and a salt additive. The major components, solute, salt additive, solvent, anode and cathode are each described in turn hereinbelow.

Solute. The term solute comprehends an ionic substance (salt) used herein to transfer charge between the anode and the cathode of a battery. Broadly, the solute of the invention comprises a lithium salt. As the solute, useful salts herein include $LiPF_6$, $LiBF_4$, $LiClO_4$, $LiAsF_6$, $LiTaF_6$, $LiAlCl_4$, $Li_2B_{10}Cl_{10}$, $LiCF_3SO_3$; $LiE$ $(C_nF_{2n+1}SO_2)_m$, wherein m=2 or 3, wherein E=N when m=2, and wherein E=C when m=3, and n=1-10; $LiPF_x(R_F)_{6-x}$ and $LiBF_y(R_F)_{4-y}$, wherein $R_F$ represents perfluorinated $C_1$-$C_{20}$ alkyl groups or perfluorinated aromatic groups, x=0-5, and y=0-3. Combinations of the aforementioned salts may be used. Broadly, the concentration of the solute in the electrolytic solution is about 0.1-2.5 M (moles per liter). Preferably the solute concentration is 0.4-2.0 M, and more preferably 0.7-1.6M. In a more preferred embodiment, the electrolytic solution comprises 1.0M $LiPF_6$.

Salt Additive. The additive herein is an ionic substance (salt) used to help generate the solid electrolyte interface (SEI) at the surface of the anode. Broadly, the salt additive of the invention comprises salts of chelated orthoborates and chelated orthophosphates. The cations of the salt additives can be selected from alkali metal ions, alkaline earth metal ions, transition metal ions and oniums. In a preferred embodiment, the salt additive is LiBOB. Other salt additives may be used as well, either instead of or in addition to, LiBOB, for example, lithium bis(malonato)borate (LiBMB), lithium bis(difluoromalonato)borate (LiBDFMB), lithium (malonato oxalato)borate (LiMOB), lithium (difluoromalonato oxalato)borate (LiDFMOB), lithium tris(oxalato) phosphate (LiTOP), and lithium tris(difluoromalonato)phosphate (LiTDFMP).

Broadly, the salt additive is present in the electrolytic solution at a concentration of 0.001M to 0.15 M. Preferably the salt additive concentration is about 0.01 M to 0.15 M, and more preferably about 0.01-0.12M. In a preferred embodiment, the salt additive comprises LiBOB, at a concentration not exceeding about 0.10 M Solvent. The solvent is a non-aqueous, aprotic, polar organic substance which dissolves the solute and salt additive. Blends of more than one solvent may be used. Generally, solvents may be carbonates, carboxylates, lactones, phosphates, five or six member heterocyclic ring compounds, and organic compounds having at least one $C_1$-$C_4$ group connected through an oxygen atom to a carbon. Lactones may be methylated, ethylated and/or propylated. Generally, the electrolytic solution comprises at least one solute dissolved in at least one solvent. Useful solvents herein include ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, and combinations thereof. Other solvents may be used so long as they are non-aqueous and aprotic, and are capable of dissolving the solute and salt additive.

In a preferred embodiment, the solvent is selected from the group consisting of ethylene carbonate, propylene carbonate and diethyl carbonate and combinations thereof. In a further preferred embodiment, the solvent comprises about 1-50 wt % ethylene carbonate, about 1-50 wt % propylene carbonate and about 1-80 wt % diethyl carbonate. In another preferred embodiment, the solvent comprises about 30 wt % ethylene carbonate, about 10 wt % propylene carbonate and about 60 wt % diethyl carbonate.

Anode. The anode may comprise carbon or compounds of lithium. The carbon may be in the form of graphite. Lithium metal anodes may be used. Lithium MMOs such as $LiMnO_2$ and $Li_4Ti_5O_{12}$ are also envisioned. Alloys of lithium with transition or other metals (including metalloids) may be used, including LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, and combinations thereof. The anode may further comprise an additional material such as a metal oxide including SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof.

Cathode. The cathode comprises a lithium metal oxide compound. In particular, the cathode comprises at least one lithium mixed metal oxide (Li-MMO). Lithium mixed metal oxides contain at least one other metal selected from the group consisting of Mn, Co, Cr, Fe, Ni, V, and combinations thereof. For example the following lithium MMOs may be used in the cathode: $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$ (0<x<1), $LiFePO_4$, $LiMn_{0.5}Ni_{0.5}O_2$, $LiMn_{1/3}Co_{1/3}Ni_{1/3}O_2$, and $LiMc_{0.5}Mn_{1.5}O_4$ wherein Mc is a divalent metal. Mixtures of such oxides may also be used.

Either the anode or the cathode, or both, may further comprise a polymeric binder. In a preferred embodiment, the binder may be polyvinylidene fluoride, styrene-butadiene rubber, polyamide or melamine resin, and combinations thereof.

The electrolytic solution in the present invention may further comprise one or more additives, such as a sultone (e.g., 1,3-propane sultone, and 1,4-butane sultone) to prevent or to reduce gas generation of the electrolytic solution as the battery is charged and discharged at temperatures higher than ambient temperature, and/or an aromatic compound (e.g., biphenyl and cyclohexylbenzene) to prevent overcharge or overdischarge of the battery.

It is envisioned that the salt additives, electrolytic solutions and batteries discussed herein have a wide range of applications, including, at least, calculators, wrist watches, hearing aids, electronics such as computers, cell phones, games etc, and transportation applications such as battery powered and/or hybrid vehicles.

The following compositions represent exemplary embodiments of the invention. They are presented to explain the invention in more detail, and do not limit the invention.

(1) Preparation of Electrolytic Solutions. Ethylene carbonate (EC), propylene carbonate (PC) and diethyl carbonate (DEC) were mixed in a weight ratio of 3:1:6 to prepare a nonaqueous organic solvent mixture. Lithium hexafluorophosphate ($LiPF_6$) was added into the solvent mixture to give a $LiPF_6$ concentration of 1.0 M, for the electrolytic solution of Comparative Example A. Lithium bis(oxalato) borate (LiBOB) was added into the electrolytic solution of Comparative Example A in the amount shown in Table 1, to give the electrolytic solutions of Examples 1 and 2. In Comparative Examples B-C, vinylene carbonate (VC) was used in place of LiBOB. All exemplary solutions were formulated at ambient temperature (ca. 23° C.).

TABLE 1

Electrolytic Solutions: Inventive Examples 1-2 and Comparative Examples A-C.

| Example | $LiPF_6$ | Additive LiBOB | VC |
|---|---|---|---|
| Example 1 | 1.0 M | 1% (0.06 M) | — |
| Example 2 | 1.0 M | 2% (0.11 M) | — |
| Comparative Example A | 1.0 M | — | — |
| Comparative Example B | 1.0 M | — | 1% |
| Comparative Example C | 1.0 M | — | 2% |

(2) Preparation of a Cathode. A positive electrode slurry was prepared by dispersing $LiCoO_2$ (positive electrode active material, 90 wt %), poly(vinylidenefluoride) (PVdF, binder, 5 wt %), and acetylene black (electro-conductive agent, 5 wt %) into 1methyl-2-pyrrolidone (NMP). The slurry was coated on aluminum foil, dried, and compressed to give a cathode. The cathode was die-cut into discs by a punch with a diameter of 12.7 mm.

(3) Preparation of an Anode. Natural graphite (negative electrode active material, 95 wt %) and PVdF (binder, 5 wt %) were mixed into NMP to form a negative active material slurry which was coated on copper foil, dried, and pressed to give an anode. The anode was die-cut into discs by a punch with a diameter of 14.3 mm. (4) Assembly of a Lithium Ion Secondary Battery. A separate battery containing each of the above mentioned electrolytic solutions (Examples 1-2 and Comparative Examples A-C) was made by the following procedure. In a dry box under an argon atmosphere, a lithium ion secondary battery was assembled using a 2032 type coin cell. A cathode was placed on a cathode can, and a microporous polypropylene film (25 μm thickness and 19.1 mm diameter) was placed as a separator. It was pressed with a polypropylene gasket, and an anode was placed. A stainless steel spacer and spring were included to adjust the thickness and make good contact. An electrolytic solution of each of Examples 1-2 and Comparative Examples A-C was added to each of five separate batteries and allowed to absorb. An anode cover was mounted to seal each battery with a crimper, to complete the assembly of the coin type lithium ion secondary battery.

(5) Testing of the Batteries. Evaluation of the aforementioned assembled batteries (e.g., Examples 1-2; Comparative Examples A-C) was carried out in the order (A) initial charging and discharging (confirmation of capacity); (B) life cycle test; and (C) high temperature storage test.

A. Capacity Confirmation. Initial charging and discharging of the aforementioned assembled batteries were performed according to the constant current/voltage charging and constant current discharging method in a room temperature atmosphere. The battery was first charged up to 4.2 Volts (V) at a constant current rate of 0.3 $mA/cm^2$ (milliamps per square centimeter). After reaching 4.2 V, the battery was continually charged at a constant voltage of 4.2 V until the charging current reached or was less than 0.1 mA. Then the battery was discharged at a constant current rate of 0.3 $mA/cm^2$ until the cut-off voltage 3.0 V reached. Standard capacity (C) of a nonaqueous electrolyte secondary battery was 3.2 mAh (milliamp hours).

B. Life Cycle Test. Life cycle testing was conducted over 100 cycles at room temperature by charging the aforementioned initially charged/discharged batteries at a constant current rate of C/2 (1.6 mA) to 4.2 V and then charged at a constant voltage of 4.2 V till the current reached or was less than 0.1 mA. After that the battery was discharged at a constant current rate of C/2 (1.6 mA) until the cut-off voltage 3.0 V reached. Discharge capacity retention rate of cycle life (%)=($n^{th}$ cycle discharge capacity/$1^{st}$ cycle discharge capacity)×100%. First cycle efficiency is cycle discharge capacity/1st cycle charge capacity×100%. Table 2 displays the results of the life cycle testing, and Table 3 displays the results of the high temperature storage testing.

TABLE 2

Life cycle testing results.

| Electrolyte | $1^{st}$ cycle charge capacity (mAh) | $1^{st}$ cycle efficiency | Discharge capacity retention | |
|---|---|---|---|---|
| | | | $50^{th}$ cycle | $100^{th}$ cycle |
| Example 1 | 3.42 | 88.3% | 96.3% | 95.7% |
| Example 2 | 3.32 | 94.3% | 91.4% | 90.8% |
| Comparative Example A | 3.35 | 91.9% | 89.0% | 89.0% |
| Comparative Example B | 3.43 | 89.2% | 86.1% | 85.3% |
| Comparative Example C | 3.44 | 93.0% | 90.5% | 90.9% |

High Temperature Storage Test. A high temperature storage test was carried out in the following manner. The aforementioned finished cycled batteries were maintained in a 60° C. oven for 4 hours, cooled at room temperature for 3 hours and then cycled 10 times at C/2 rate between 4.2 V and 3.0 V. Discharge capacity retention rate after 60° C. storage (%)=($101^{st}$ cycle discharge capacity/$100^{th}$ cycle discharge capacity)×100%.

TABLE 3

High temperature storage test results.

| Electrolyte | Discharge capacity at $100^{th}$ cycle at 23° C. (mAh) | Discharge capacity retention after storage at 60° C. for 4 hrs |
|---|---|---|
| Example 1 | 2.89 | 76.1% |
| Example 2 | 2.84 | 82.4% |
| Comparative Example A | 2.74 | 48.2% |
| Comparative Example B | 2.62 | 29.3% |
| Comparative Example C | 2.91 | 69.8% |

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general invention concept as defined by the appended claims and their equivalents.

What is claimed is:

1. A secondary battery comprising an anode, a cathode, and an electrolytic solution, wherein the electrolytic solution comprises a non-aqueous solvent, a solute, and a salt additive, the salt additive comprising lithium bis(oxalato)borate provided that the concentration of lithium bis(oxalato)borate in the solution does not exceed 0.15 M, wherein
the anode comprises
a first material selected from the group consisting of crystalline carbon, lithium metal, $LiMnO_2$, LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, $Li_4Ti_5O_{12}$, and combinations thereof, and
a second material selected from the group consisting of SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof.

2. The secondary battery of claim 1, wherein the anode further comprises a binder selected from the group consisting of polyvinylidene fluoride, styrene-butadiene rubber, polyamide, melamine, and combinations thereof.

3. The secondary battery of claim 1, wherein the solute is selected from the group consisting of $LiPF_6$, $LiBF_4$, and combinations thereof.

4. The secondary battery of claim 1, wherein the non-aqueous solvent is selected from the group consisting of ethylene carbonate, propylene carbonate and diethyl carbonate and combinations thereof.

5. The secondary battery of claim 1, wherein the salt additive comprises 0.01 M to 0.12 M lithium bis(oxalato) borate.

6. The secondary battery of claim 1 wherein the salt additive further comprises cations selected from the group consisting of alkali metal ions, alkaline earth metal ions, transition metal ions and oniums.

7. The secondary battery of claim 1 further comprising a second salt additive selected from the group consisting of lithium bis(malonato) borate, lithium bis(difluoromalonato) borate, lithium (malonato oxalato) borate, lithium (difluoromalonato oxalato) borate, lithium tris(oxalato)phosphate, and lithium tris(difluoromalonato)phosphate, and combinations thereof, provided that the total concentration of orthoborate and orthophosphate salts does not exceed 0.15 M.

8. The secondary battery of claim 7 wherein the salt additive comprises 0.01 M to 0.12 M lithium bis(oxalato) borate.

9. The secondary battery of claim 1 wherein the solute is selected from the group consisting of $LiPF_6$, $LiBF_4$, $LiClO_4$, $LiAsF_6$, $LiTaF_6$, $LiAlCl_4$, $Li_2B_{10}Cl_{10}$, $LiCF_3SO_3$; $LiE(C_nF_{2n+1}SO_2)_m$, wherein m=2 or 3, wherein E=N when m=2, wherein E=C when m=3, and n=1-10; $LiPF_x(R_F)_{6-x}$ and $LiBF_y(R_F)_{4-y}$, wherein $R_F$ represents perfluorinated $C_1$-$C_{20}$ alkyl groups or perfluorinated aromatic groups, x=0-5, and y=0-3, and combinations thereof.

10. The secondary battery of claim 9 wherein the solute is present in a concentration of about 0.1 to about 2.5 M.

11. The secondary battery of claim 1 wherein the non-aqueous solvent is selected from the group consisting of ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, and combinations thereof.

12. The secondary battery of claim 1 wherein the cathode comprises a lithium mixed metal oxide selected from the group consisting of $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2(0<x<1)$, $LiFePO_4$, $LiMno_{0.5}Ni_{0.5}O_2$, $LiMn_{1/3}Co_{1/3}Ni_{1/3}O_2$, and $LiMc_{0.5}Mn_{1.5}O_4$ wherein Mc is a divalent metal, and mixtures thereof.

13. The secondary battery of claim 1 wherein the cathode further comprises a binder selected from the group consisting of polyvinylidene fluoride, styrene-butadiene rubber, polyamide, melamine, and combinations thereof.

14. A secondary battery comprising an electrolytic solution, wherein the electrolytic solution comprises a non-aqueous solvent, a solute, and a salt additive, the salt additive comprising lithium bis(oxalato)borate provided that the concentration of lithium bis(oxalato)borate in the solution does not exceed about 0.10 M, wherein the non-aqueous solvent comprises about 1-50 wt % ethylene carbonate, about 1-50 wt % propylene carbonate and about 1-80 wt % diethyl carbonate.

15. The secondary battery of claim 14 wherein the salt additive further comprises cations selected from the group consisting of alkali metal ions, alkaline earth metal ions, transition metal ions and oniums.

16. The secondary battery of claim 14 further comprising a second salt additive selected from the group consisting of lithium bis(malonato) borate, lithium bis(difluoromalonato) borate, lithium (malonato oxalato) borate, lithium (difluoromalonato oxalato) borate, lithium tris(oxalato)phosphate, and lithium tris(difluoromalonato)phosphate, and combinations thereof, provided that the total concentration of orthoborate and orthophosphate salts does not exceed 0.15 M.

17. The secondary battery of claim 14 wherein the solute is present in a concentration of about 0.1 to about 2.5 M and is selected from the group consisting of $LiPF_6$, $LiBF_4$, $LiClO_4$, $LiAsF_6$, $LiTaF_6$, $LiAlCl_4$, $Li_2B_{10}Cl_{10}$, $LiCF_3SO_3$; $LiE(C_nF_{2n+1}SO_2)_m$, wherein m=2 or 3, wherein E=N when m=2, and wherein E=C when m=3, and n=1-10; $LiPF_x(R_F)_{6-x}$ and $LiBF_y(R_F)_{4-y}$, wherein $R_F$ represents perfluorinated $C_1$-$C_{20}$ alkyl groups or perfluorinated aromatic groups, x=0-5, and y=0-3, and combinations thereof.

18. The secondary battery of claim 14 wherein the non-aqueous solvent is selected from the group consisting of ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, and combinations thereof.

19. A non-aqueous electrolytic solution for use in a secondary battery comprising a first salt, lithium bis(oxalato)borate, provided that lithium bis(oxalato)borate is present at a concentration not exceeding 0.15 M, and a solvent comprising about 1-50 wt % ethylene carbonate, about 1-50 wt % propylene carbonate and about 1-80 wt % diethyl carbonate.

20. The non-aqueous electrolytic solution of claim 19 wherein the first salt is selected from the group consisting of $LiPF_6$, $LiBF_4$, $LiClO_4$, $LiAsF_6$, $LiTaF_6$, $LiAlCl_4$, $Li_2B_{10}Cl_{10}$, $LiCF_3SO_3$; $LiE(C_nF_{2+1}SO_2)_m$, wherein m=2 or 3, wherein E=N when m=2, and wherein E=C when m=3, and n=1-10; $LiPF_x(R_F)_{6-x}$ and $LiBF_y(R_F)_{4-y}$, wherein $R_F$ represents perfluorinated $C_1$-$C_{20}$ alkyl groups or perfluorinated aromatic groups, x=0-5, and y=0-3, and combinations thereof.

* * * * *